United States Patent
Grilli

(10) Patent No.: US 11,575,979 B1
(45) Date of Patent: Feb. 7, 2023

(54) REAL-TIME MULTI-DIMENSIONAL MONITORING OF ENVIRONMENTAL PARAMETERS

(71) Applicant: Amazon Technologies, Inc., Seattle, WA (US)

(72) Inventor: Gianluca Grilli, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 233 days.

(21) Appl. No.: 16/915,297

(22) Filed: Jun. 29, 2020

(51) Int. Cl.
*H04Q 1/00* (2006.01)
*H04Q 1/20* (2006.01)
*H04Q 1/02* (2006.01)

(52) U.S. Cl.
CPC ............... *H04Q 1/20* (2013.01); *H04Q 1/025* (2013.01)

(58) Field of Classification Search
CPC .................................. H01Q 1/20; H01Q 1/025
See application file for complete search history.

(56) References Cited

U.S. PATENT DOCUMENTS

| | | | |
|---|---|---|---|
| 2013/0120135 A1* | 5/2013 | Benson | H04N 7/181 340/506 |
| 2014/0320308 A1* | 10/2014 | Lewis | H04Q 9/00 340/870.07 |
| 2020/0231209 A1* | 7/2020 | Walentowski | B62D 15/0225 |

FOREIGN PATENT DOCUMENTS

WO WO-2021228934 A1 * 11/2021

* cited by examiner

*Primary Examiner* — Khai M Nguyen
(74) *Attorney, Agent, or Firm* — Kilpatrick Townsend & Stockton LLP

(57) ABSTRACT

Systems and methods for monitoring and detecting parameters within a facility. The systems and methods include an actuator to adjust a position of a sensor device, the sensor device capable of gathering sensor data related to one or more parameters. The sensor device is in communication with a transmitter to transmit sensor data, a horizontal position, and a vertical position of the sensor device as it moves and gathers the sensor data. The data is assembled into a data structure showing the data throughout the facility for identification of abnormalities and adjustment of facility parameters.

20 Claims, 6 Drawing Sheets

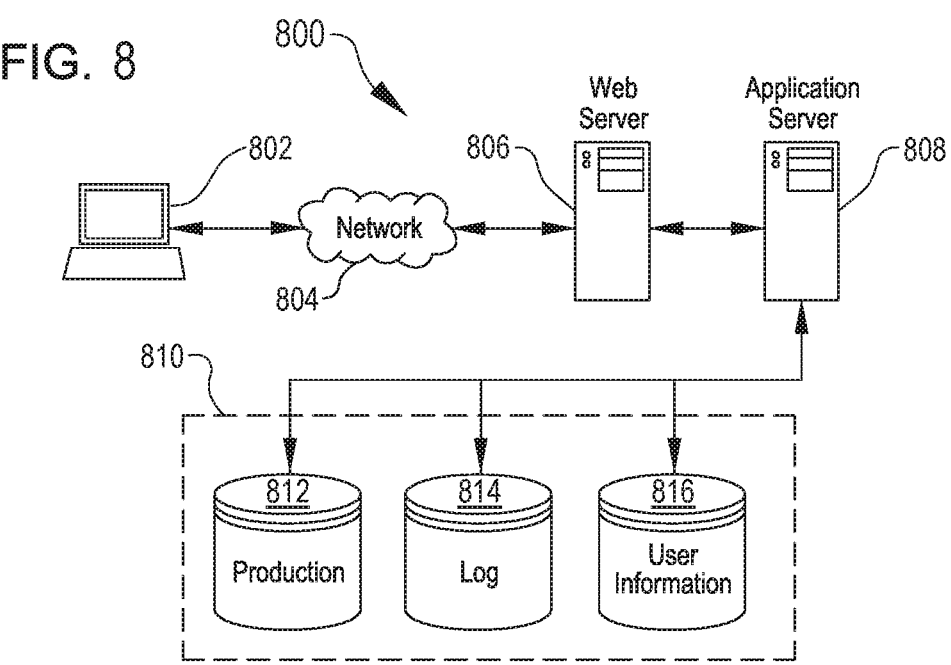

US 11,575,979 B1

REAL-TIME MULTI-DIMENSIONAL MONITORING OF ENVIRONMENTAL PARAMETERS

BACKGROUND

A datacenter typically contains a collection of computer servers and components for the management, operation and connectivity of those servers. Even in isolation, datacenter electronic components may generate sufficient heat that temperature management is important to prolong the life of the components and to allow smooth and continuous operation of the datacenter. Datacenter electronic components are often arranged together. For example, datacenter electronic components can be vertically arranged in racks or within server cabinets. When heat-generating electronic components are arranged together, however, the cumulative generation of heat can increase the ambient temperature and exacerbate the challenge of managing the temperature of individual components.

BRIEF DESCRIPTION OF THE DRAWINGS

Various embodiments in accordance with the present disclosure will be described with reference to the drawings, in which:

FIG. 8 illustrates an example environment in which various embodiments can be implemented.

DETAILED DESCRIPTION

Figure 1:
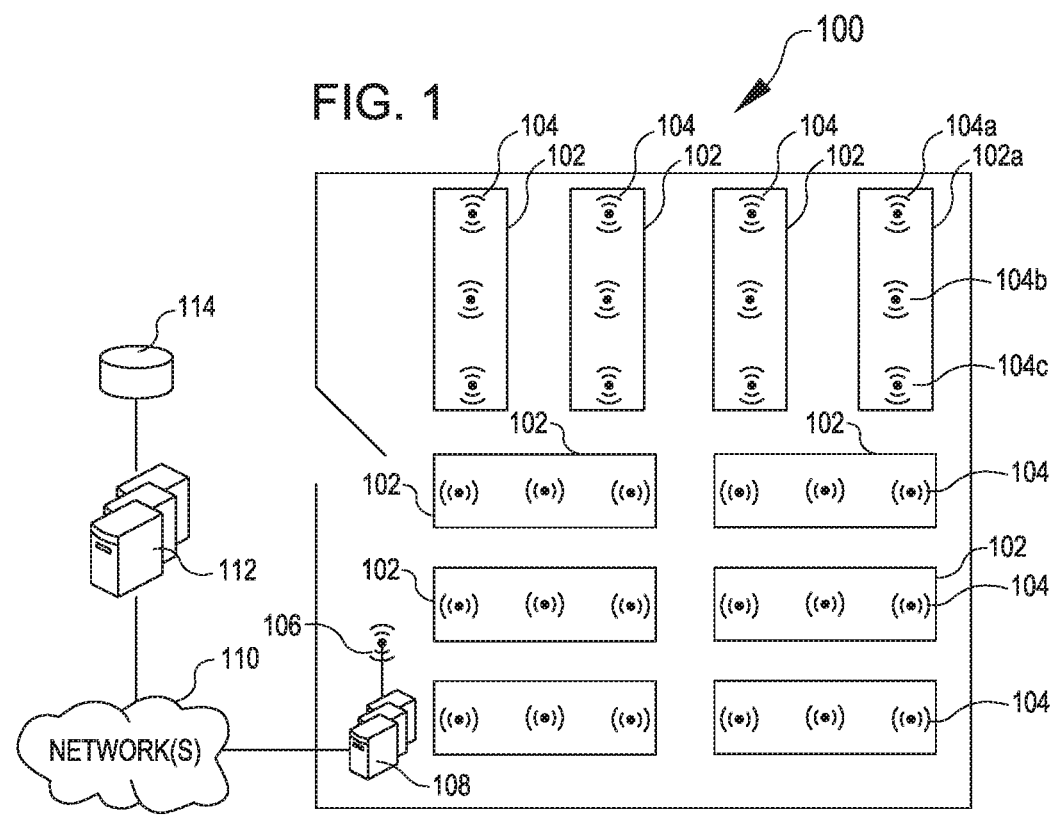
FIG. 1 depicts a top view of a facility including a system for gathering real-time environmental parameters in three dimensions in accordance with at least some embodiments described herein.

Techniques described herein include systems and methods by which real-time parameters may be gathered in several dimensions and used to generate a data structure showing the parameters over the volume of a facility. In particular, the systems and methods herein may be useful for identifying components, such as servers, within a datacenter that are producing additional heat or creating hotspots within the datacenter. The systems and methods provide three dimensional representations of the datacenter including data gathered by the sensors across the three dimensions. Due to malfunctions of equipment within a datacenter, or poor circulation or flow of cooling air through the datacenter, hotspots may exist within the datacenter, and if left unattended, the hotspots may result in further malfunctions or problems with equipment within the datacenter. The sensors may move along the server racks continually or at regular intervals to provide up to date snapshots of environmental conditions within the datacenter. The data from the sensors in (x,y,z) positions throughout the datacenter may be useful for identifying malfunctioning components, redirecting cooling resources, pinpointing problematic areas, or otherwise assessing the status and conditions throughout the volume of space within the datacenter. In some examples, the sensors may provide locations of objects, such as appliances, within the datacenter.

By way of illustration, consider a scenario in which the system is implemented within a datacenter. The datacenter includes a plurality of server racks housing electronic components (e.g., servers). The server racks include actuators that span the height of the server racks and enable sensors to be positioned by the actuators along the height of the server rack. Associated with each server rack is a network radio, such as a 5G radio that transmits data gathered by the sensor, the position of the sensor on the server rack, and the position of the server rack to a computing resource of the datacenter. The vertical position of the sensor may be determined based on the position of the actuator and the position of the server rack determined based on the position of the 5G radio. In one example, a particular component may overheat during operation but not have overheated to the point of disruption of the system or shutdown of the component. The sensors of the system, which traverse the server rack, may detect an increase in temperature in an area surrounding the overheating component. The identity and location of the component, as well as the temperature increase can be identified through the system and targeted for maintenance, additional cooling resources, or other operations.

In a second scenario, the system may be outfitted on a storage unit, which may include a server rack, a storage shelf, a library shelf, or other such storage unit within a space. The sensors of the system may include identification sensors such as RFID sensors, cameras, barcode scanners, or other such sensors to identify items on the storage unit as the sensor traverses the storage unit. The system may be implemented to perform an inventory of a storage facility based on the identities of items identified by the sensors. The computing resource of the storage facility may process the identification information, such as by querying a database of identifiers, performing image recognition algorithms, or other means of identifying items scanned by the system. In some examples, the system may perform the inventory when requested by a user. In some examples, the system may perform the inventory search at a regular interval, such as daily, hourly, weekly, or any other suitable timeframe.

Embodiments are described herein in connection with a server rack in a datacenter and temperature monitoring of the same, however, embodiments are not limited as the systems and methods described herein may apply to any type of facility and storage unit and with respect to any type of environmental or other sensor-detectable data. In some examples the facility may be a retail space, warehouse, fulfillment center, library, archive, personal item storage, agricultural facility, or other such facilities. In some examples, the environmental data may include temperature, humidity, pressure, occupancy, identity, and/or other such information detectable by a sensing device. In embodiments of the systems and methods, an actuator with a sensing device connected thereto is positionable to gather sensor data over a range of positions in any direction to gather environmental data over the range of positions. The sensing device is in communication with a transmitter that transmits the data to a computing system of the facility.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 depicts a facility 100 including a system for gathering real-time environmental parameters in three dimensions in accordance with at least some embodiments described herein. The facility 100 may be a datacenter that hosts a number of computing resources in racks 102. The facility 100 may also include a storage space, warehouse environment, or any environment where items or components are stored on shelves or vertical storage devices. The racks 102 are arranged in rows.

At each rack 102, sensor device are coupled to actuators to traverse the racks 102 in at least one direction. As the sensor devices traverse the racks 102 they gather, via various sensors and elements, data corresponding to the environment at the varying position along the rack 102, information relating to occupancy of the rack, identities of items on the racks, or any other data that may be captured through a sensor. The sensor device also gathers, detects, or outputs, a position of the sensor device relative to the rack 102. The data gathered by the sensor device is transmitted to a network radio 104.

Each rack 102 includes one or more network radios 104 that communicate with a receiver 106 connected to a computing device 108 of the facility 100. The network radios 104 convey data gathered at each of the racks 102 to the computing device 108. Because the racks 102 cover a substantial portion of the facility 100 (at least in this example), the data gathered at each of the racks 102 provides a snapshot of conditions within the facility 100 including environmental conditions. In some examples, the system provides data corresponding to items contained at each of the racks 102 for an inventory maintained by the computing device 108.

In particular, a rack 102a includes transmitters 104a-c. Each of the transmitters 104a-c are associated with a sensor device traversing at least a portion of the rack 102. In some examples, each rack 102 may include a single network radio 104 in communication with multiple sensor devices on the rack 102. In a first example, each sensor device has a single associated transmitter that transmits the position of the sensor and data gathered by the sensor device to the network radio 104. The transmitter may, in some examples be hard-wired to the network radio 104. The transmitter may be a radio, a short range transmitter such as BLUETOOTH™, ZIGBEE™, WIFI, point-to-point, or wired. The network radio 104, can be a long range communication device capable of high accuracy position determination, such as a 5G radio or a WIFI radio capable of position determination within a range of several centimeters. In some examples, the network radio 104 can be wired to a central computer 112 for communications. In a second example, each sensor device includes or is coupled directly to a network radio 104 associated with the sensor device. In some examples, multiple transmitters or multiple network radios 104 may be associated with a single rack 102. In the instance of multiple sensor devices communicating with a single network radio 104, the sensor devices may tag or append all data conveyed through the network radio 104 to the computing device 108 with a sensor device identifier, such as in metadata associated with data conveyed from the sensor device.

The computing device 108 is in communication, over a network 110 with a remote computing device 112. The remote computing device 112 may manage operation of the facility 100, for example by controlling other systems of the facility 100 including cooling systems, inventory systems, maintenance systems, fault systems, and other such systems of the facility 100. The computing device 108 is also in communication with a database 114 where data gathered by the sensor devices at each of the racks 102 may be stored, in addition to other data relating to operation of the facility 100.

Figure 2:
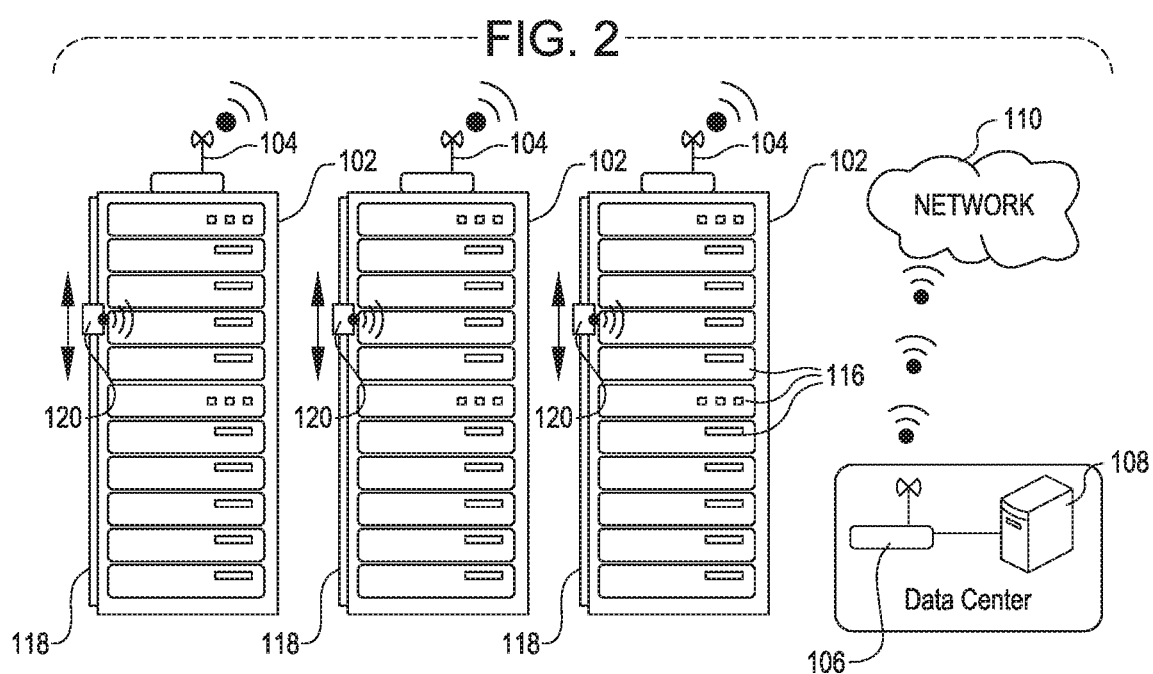
FIG. 2 depicts a front view set of electronic datacenter component racks including a system for gathering real-time environmental parameters in three dimensions in accordance with at least some embodiments described herein.

FIG. 2 depicts a set of racks 102 including a system for gathering real-time data in three dimensions in accordance with at least some embodiments described herein. The set of racks displayed in FIG. 2 may be a portion of the racks 102 shown in FIG. 1. The racks 102 are shown as electronic datacenter component racks with electronic datacenter components 116 stored thereon though may be any structure including shelves, walls, pillars, or any other structural features of a facility 100. The racks 102 each include an actuator 118, a sensor device 120, and a network radio 104.

The actuator 118 traverses the rack 102 in at least one axis. In the example shown in FIG. 2, the actuator 118 includes a rail system aligned with a vertical axis of the rack 102. In some examples, the actuator 118 may traverse a vertical axis as well as a horizontal axis. In some examples, the actuator 118 may traverse a direction diagonal with respect to a horizontal or vertical axis of the rack 102. In some examples, the actuator 118 may traverse a circular path or route around the rack 102, such as up a first side of the rack 102, across the top, and down a second side of the rack 102 before returning up the first side. In some examples, the actuator 118 may actuate the sensor device 120 along a single axis in a first direction before returning in an opposite direction along the same single axis. The actuator 118 may include elements or features capable of tracking and outputting a position of the actuator with respect to a reference location, such as the end of the track of actuator 118.

The actuator 118 may include any suitable actuating mechanism including linear actuators, rack and pinion gear systems, cable systems, or any other known actuating system for positioning a device in various positions. The actuator 118 may be built in to the rack 102 or may be configured as an add-on that may be retrofit onto racks 102 in existing installations.

Figure 3:
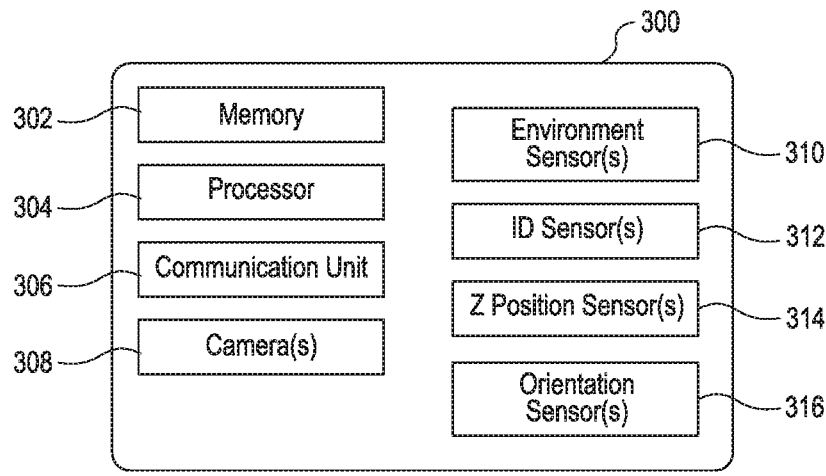
FIG. 3 depicts a block diagram illustrating elements of a sensor device in accordance with at least some embodiments described herein.

The sensor device 120 is discussed in greater detail in FIG. 3, where elements of the sensor device 120 are displayed as blocks in the block diagram. Generally, the sensor device 120 includes sensors and devices to gather data as the sensor device 120 is moved between positions by the actuator 118. The sensor device 120 is in communication with the network radio 104 which may then communicate data from the sensor device 120 to a receiver 106 connected to a computing device 108 of the facility 100. The sensor device 120 may include or interface with a transmitter that transmits the position and sensor data to the network radio. The transmitter may be integrated within the sensor device 120 or may be separate from the sensor device 120, such as a standalone transmitter unit with a wired connection to the sensor device 120. The transmitter unit may be connected to the actuator 118 alongside the sensor device 120 in some examples. In some examples, the transmitter unit may be integrated within the actuator 118. The sensor device 120 outputs, in addition to the sensor data, a position of the sensor device 120. The position of the sensor device 120 may be output as a vertical position with respect to a supporting surface on which the racks 102 rest, as illustrated in FIG. 2. In some examples, the position of the sensor device 120 may include a vertical position in addition to a horizontal position component. For example, the sensor device 120 may output a position of the sensor device relative to a corner of the rack 102 including an x-coordinate, y-coordinate, and z-coordinate in a three dimensional space. The relative position of the sensor device 120 with respect to the origin may be added, such as with vector addition, to the position of the network radio 104 described below to determine an absolute location of the sensor device 120 within the facility.

The network radio 104 may be any communication device capable of communication to a remote receiver 106 over a network 110. The network 110 may include any wired or wireless connection, including those described with respect to FIG. 8 below. The network radio 104 may be a 5G radio that includes functionality for outputting, in addition to data from the sensor device 120, the location of the 5G radio. The location of the 5G radio may include only a horizontal location of the 5G radio. The network radio can be any type of radio. The network radio is capable of determining its position and transmitting the position, as described above, one example is a 5G radio. The location may be given as a relative position in relation to the receiver 106, may be provided based on a local coordinate system, such as a location within facility 100, may be provided as a location based on global geographic systems, or any other suitable reference frame for providing the location. In some examples, the location of the network radio 104 may be provided as a location based on a global positioning system (GPS) set or predetermined and associated with each network radio 104. A 5G radio may be especially well suited as the horizontal location of the 5G radio can be determined with high accuracy and thereby provide a highly accurate location of the rack 102, for example, within several inches.

As the sensor device 120 is moved along the rack 102 by the actuator 118, the data gathered by the sensor device 120 and associated position data is conveyed to the network radio 104 over a wireless connection, such as a BLUETOOTH' connection or other local wireless connection. The connection between the sensor device 120 and the network radio 104 may also be a wired connection. The sensor data and the position data are then conveyed to the computing device 108 for use in monitoring the conditions within the facility 100, evaluating inventory within the facility 100, controlling operations of other systems associated with the facility 100 including maintenance systems for server components and cooling systems for the facility 100 to direct cooling resources where needed based on the sensor data, or other such systems.

In some examples, when the computing device 108 determines an abnormality exists within the sensor data, such as a temperature or humidity spike, the computing device 108 may cause the sensor device 120 to move along the rack 102 at a higher frequency than a typical data gathering frequency, gathering additional data regarding the temperature. A typical data frequency may be for the sensor device 120 to complete a cycle every five minutes, when an abnormality is determined, the computing device 108 may cause the sensor device 120 to gather data once every minute until the abnormality is resolved. In some examples a fault notification may be generated in response to determining the abnormality exists within the data and presented to a maintenance or user console at the facility 100.

FIG. 3 depicts a block diagram illustrating elements of a sensor device 300 in accordance with at least some embodiments described herein. The sensor device 300 may be the sensor device 120 of FIG. 2. The sensor device 300 and the elements shown in the block diagram may all be contained within a single sensor device or may be included in multiple different devices that together have the functionality described herein. The sensor device 300 includes a memory 302, a processor 304, a communication unit 306, a camera 308, an environment sensor 310, an identity sensor 312, and a z position sensor 314.

The elements of the sensor device 300 are electrically coupled together to provide the features of the disclosure as described herein. The memory 302, processor 304, and communication unit 306 may be contained within a single device or chip or may alternatively be separate components within the sensor device 300. The sensor device 300 may be powered through a power supply that is wired, such as through a connection to the rack 102, or may be powered by a battery or any other suitable power supply.

The processor 304 and memory 302 are in communication with the communication unit 306 and are capable of performing the methods described below with respect to FIG. 6 as well as providing signals or instructions to the network radio 104, camera 308, environment sensor 310, identity sensor 312, and z position sensor 314. There may be multiple processors or memory devices associated with the sensor device 300, though only one is shown in FIG. 3.

The communication unit 306 may provide communications between the sensor device 300 and a network radio 104, for example to convey sensor data to the network radio 104 to convey to the computing device 108. As an example, the communication unit 306 may communicate with other elements using BLUETOOTH™, BLUETOOTH™ LOW ENERGY (BLE), RFID, or other such wireless communications to transmit and receive information. In some embodiments, a communication between the sensor device 300 and other elements such as the network radio 104 may be indirect, in that the communication is transmitted over a network 110. The communication unit 306 may include or interface with a transmitter that transmits the position and sensor data to a network radio, The transmitter may be integrated within the sensor device 300 as the communication unit 306 or may be in communication with the sensor device 300 via the communication unit 306 or may be separate from the sensor device 300, such as a standalone transmitter unit with a wired connection to the sensor device 300. The transmitter unit may be connected to the actuator alongside the sensor device 300 in some examples. In some examples, the transmitter unit may be integrated within the actuator.

The camera 308 may include one or more optical sensors to capture images of one or more fields of view as the sensor device 300 moves along the rack 102. The camera 308 may include a wide-angle lens for capturing a large field of the rack 102 from a relatively close position. In some examples, the camera 308 is directed laterally along the rack 102 to provide a view of the components 116 stored in the rack 102. In some examples the camera 308 may be useful for capturing real-time images of malfunctioning components or for capturing inventory positioned on a storage unit, as shown and described with respect to FIG. 5 below.

The environment sensor 310 may include a sensor that gathers data related to one or more environmental parameters at the position of the sensor device 300. Some examples of environment sensors 310 include a temperature sensor, a humidity sensor, a pressure sensor, a light sensor, or other sensors to gather data relating to conditions in the area surrounding the rack 102. The environment sensor 310 may include more than one sensor coupled or joined together to form a sensor array to gather multiple types of data simultaneously.

The identity sensor 312 may gather information relating to an identity of an item stored on the rack 102. In some examples, the identity sensor 312 may include an RFID sensor to read an RFID signal, a camera configured to work in communication with a computing resource operating an image recognition algorithm on images captured by the camera, an occupancy sensor, a barcode reader, a LIDAR sensor, or any other sensor or device useful for detecting an identity or presence of an item in the rack 102.

The z position sensor 314 gathers data relating to a position of the sensor device 300. In the example shown in FIG. 2, the z position sensor determines a z position of the sensor device 120 along the height of the rack 102. In some examples, the z position sensor may determine a z position as well as an x and y position of the sensor device 300. The position may be determined relative to a physical element in the facility, such as a supporting surface or corner of the rack 102. The z position sensor may include an optical distance sensor, a pressure-based vertical position sensor, or other means of directly measuring a distance from an object. In some examples, the z position sensor may gather information from the actuator 118 to determine a position of the sensor device 300. In some examples, the actuator 118 may include a stepper motor that advances the sensor device 300 along a track and the position or number of rotations of the stepper motor may be used to determine a position of the sensor device with respect to an original location. In another example, the actuator 118 may be a linear actuator that includes a distance feedback system to output or control a distance the linear actuator is extended. In some examples, the position of the sensor device 300 may be calculated based on a speed of travel, a cycle time, or a routine of the actuator 118. For example, in some instances the speed of the actuator and the elapsed time since a measurement cycle began may be used to determine a position of the sensor device 300 at any point in time. In another example, one complete cycle of data gathering by the sensor device 300 may be performed over a set period of time, such as a period of thirty seconds. Based on the start time of the cycle and the present time, the position of the sensor device 300 may be calculated.

Figure 4:
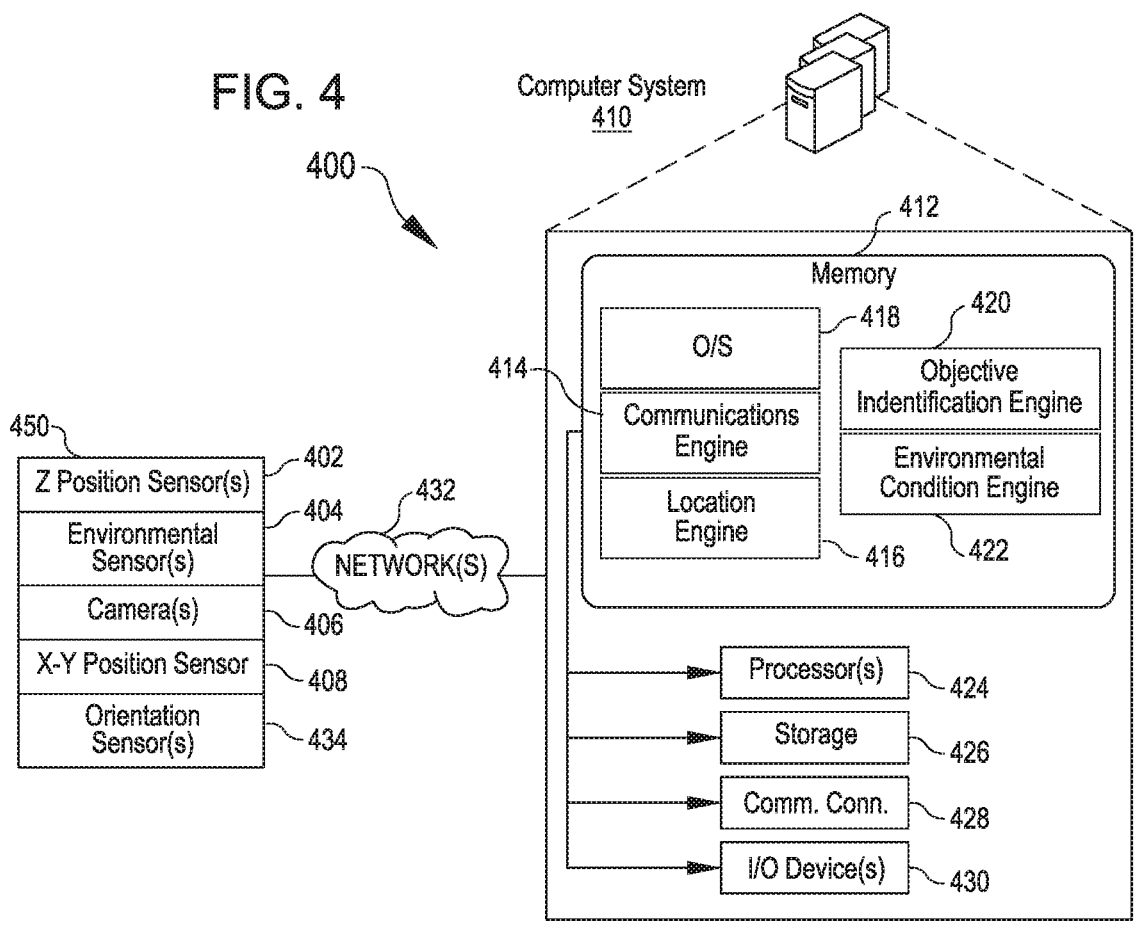
FIG. 4 depicts a block diagram illustrating elements of a system for gathering real-time environmental parameters in three dimensions in accordance with at least some embodiments described herein.

FIG. 4 depicts an example system architecture 400 for a system to gather real-time environmental parameters in three dimensions in accordance with at least some embodiments described herein. As depicted in FIG. 4, an exemplary architecture may include a sensor device 450 such as the sensor device 120 and 300 which may be connected to an actuator to adjust the position of the sensor device 450 with respect to a storage unit. The system architecture 400 may also include a computer system 410, such as a computing device coupled to the sensor device 450 to output sensor data, a computing device to receive sensor data from a network radio, a computing device to generate a data structure based on the sensor data, or any computing system associated with a facility, including those shown in FIGS. 1 and 3. One or more of these components may communicate either directly or over a network 432.

The sensor device 450 may be the sensor device 120 or 300 described herein and may include a z position sensor 402, an environmental sensor 404, a camera 406, and an x-y position sensor 408 for detecting various parameters as described with respect to the sensor devices 120 and 300 with respect to FIGS. 2-3.

The computer system 410 may be any type of computing device configured to perform at least a portion of the functionality described herein. In some embodiments, the computing system 410 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the computing system 410 may include at least one memory 412 and one or more processing units (or processor(s)) 424. The processor(s) 424 may be implemented as appropriate in hardware, computer-executable instructions, firmware or combinations thereof. Computer-executable instruction or firmware implementations of the processor(s) 424 may include computer-executable or machine-executable instructions written in any suitable programming language to perform the various functions described. The computing system 410 may also include additional storage 426.

In some examples, the computing system 410 may be a computing resource including a set of resources remote from the network radio, in communication with the network radio over one or more data networks. The computing resource may be located in the facility, located somewhere besides the facility, or distributed in multiple locations. The computing system 410 may include a server of the facility or a virtual server hosted in the datacenter.

The memory 412 may store program instructions that are loadable and executable on the processor(s) 424, as well as data generated during the execution of these programs. Depending on the configuration and type of computer system 410, the memory 412 may be volatile (such as random access memory (RAM)) and/or non-volatile (such as read-only memory (ROM), flash memory, etc.). The computer system 410 may also include additional storage 426, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM) or ROM. Turning to the contents of the memory 412 in more detail, the memory 412 may include an operating system 418 and one or more application programs or services for implementing the features disclosed herein including at least a communications engine 414, a location engine 416, an object identification engine 420, and an environmental condition engine 422.

The memory 412 and the additional storage 426, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the computer system 410. The computer system 410 may also contain communications connection(s) 428 that allow the computer system 410 to communicate with a stored database, another computing device or server, a network radio such as network radio 104, user terminals, and/or other components of the described system. The computer system 410 may also include input/output (I/O) device(s) and/or ports 430, such as for enabling connection with a keyboard, a mouse, a pen, a voice input device, a touch input device, a display, speakers, a printer, etc.

In some examples, the communications engine 414 may be configured to, in conjunction with the processor(s) 424, provide communications to one or more network radio devices or transmitters associated with sensor devices in the system. The communications engine 414 may, in some examples, identify a particular network radio or transmitter that conveyed particular data, for example to locate a position of the particular network radio within the facility to provide a location to associate with received sensor data.

In some examples, the location engine 416 may be configured to, in conjunction with the processor(s) 424, provide or determine locations of various network radios and/or sensor devices within a facility, for example based on a location of an associated rack, location of a transmitter, or to determine a location based on metadata or additional data included with sensor data conveyed from a transmitter, the metadata or additional data providing an identity and/or a location of the transmitter In some examples, the location engine 416 may determine a location of a rack as well as a position of a sensor in order to locate a three dimensional (x, y, z) position from which the sensor data has been gathered. The three dimensional data may be stored in a data structure to provide insights into three dimensional conditions within the facility as well as to provide information relating to components stored at each location on the various racks.

In some examples, the object identification engine 420 may be configured to, in conjunction with the processor(s) 424, receive sensor data including identity data from the identity sensor 312 and/or the camera 308 as described in FIG. 3 and identify one or more objects. The object identification engine may access a database storing identifiers for objects stored on the racks, such as serial numbers of servers or electronic components, or information associated with RFID tags of various devices. The object identification engine may also perform object recognition on images captured by the camera 308 to provide identities of objects stored on a storage unit, as shown with respect to FIG. 5 below.

In some examples, the environmental condition engine 422 may be configured to, in conjunction with the processor(s) 424, receive sensor data including environmental parameter data from the sensor device 450 and determine one or more environmental conditions at any particular three dimensional space as identified by the location engine 416. For example, data from the environmental sensors 404 may be interpreted by the environmental condition engine to provide an output of a temperature, humidity, pressure, or other such parameter.

In some embodiments, the network 432 may include any one or a combination of many different types of networks, such as cable networks, the Internet, wireless networks, cellular networks, and other private and/or public networks. In addition, the network 432 may comprise multiple different networks. For example, the sensor device 450 may communicate with the computer system through a transmitter, the sensor device 450 communicating over a wired connection to the transmitter and the transmitter communicating over a 5G network with the computer system 410.

Figure 5:
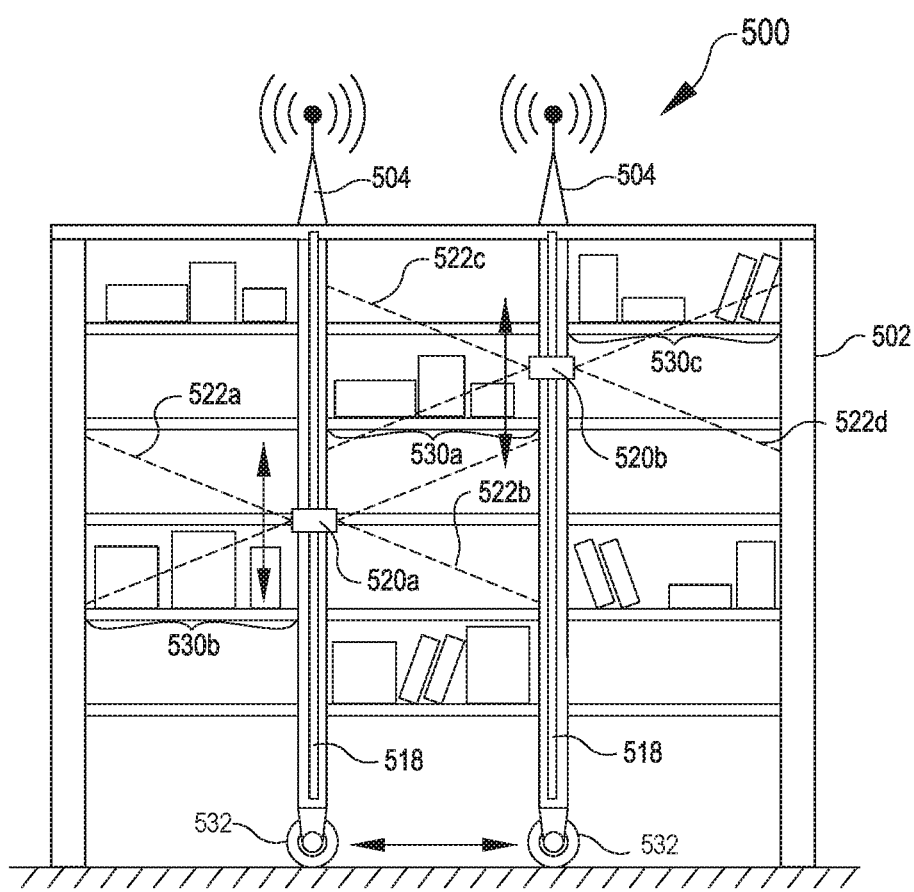
FIG. 5 depicts a storage unit outfitted with a system for gathering real-time parameters in three dimensions in accordance with at least some embodiments described herein.

FIG. 5 depicts a storage unit 500 outfitted with a system for gathering real-time parameters in three dimensions in accordance with at least some embodiments described herein. The storage unit 500 may be a shelving unit to receive inventory, such as at a warehouse or in a retail store. The storage unit 500 may also be a bookshelf in a library, or a shelf at a storage unit where inventory of items is important for maintaining up to date inventory information. The storage unit 500 may be automatically inventoried or cataloged by the system using sensor devices 520 and may also include sensors on the sensor devices to ensure proper storage of the items on the shelves.

In some examples, the storage unit 500 may include a library shelving system with books and other items stored thereon that must be cataloged for access by users. In some examples, the storage unit 500 may include a refrigerated storage unit 500, such as for food storage, including storage of meats and cheeses. The storage unit 500 must be maintained at stable and particular temperature, humidity, light, and other such factors to ensure proper storage of the food items without spoiling or adversely affecting the quality of the food. In some examples, the storage unit may include an archival system for storing art, documents, and other artifacts that must be maintained in an environment of stable humidity, temperature, and pressure. In each of these examples, the system described herein enables constant monitoring of environmental conditions in three dimensions throughout the storage unit 500 in addition to an ability to automatically inventory an entire storage facility in an automated manner, thereby reducing man-hours and effort required to perform a manual inventory and also ensuring constant and stable storage parameters.

The storage unit 500 includes a shelving unit 502 on which items can be placed. The shelving unit 502 may be formed of any material and have actuator 518 attached thereto or formed integrally with the shelving unit 502. The actuators 518 may be similar to the actuators 118 described with respect to FIG. 2. The actuators 518 may traverse a vertical axis of the shelving unit 502 or may travel in multiple directions, such as vertically and horizontally, in addition to diagonal and looped paths. As the actuators 518 position sensor devices 520 at varying positions, sensor devices 520 may gather sensor data that is recorded, after being transmitted by transmitter 504. The sensor data is recorded in connection with the particular location of the sensor device 520 at the time the sensor data was recorded. The location may include a particular shelving unit 502, a particular shelf, a coordinate within the storage facility, or any other method of identifying a location within three dimensional space.

In some examples, the actuators 518 may be slidably connected to the shelving unit 502. The actuators 518 may, for example, include wheels 532 or other moving means to allow movement of the actuators 518 in a second direction perpendicular to the axis of the actuator 518. The wheels 532 may enable a single actuator 518 to gather information across an entire shelving unit 502 rather than including multiple actuators 518 on the shelving unit 502.

In some examples, such as those including cameras to capture images of inventory items placed upon shelves of the shelving unit 502, the sensor device 520 may include multiple cameras or identification sensors pointed in varying directions to capture information relating to items stored on the shelving unit 502. For example, sensor device 520a may include a first camera having field of view 522a and a second camera having field of view 522b to capture images of adjacent shelving units for inventory purposes. In some examples, the sensors of the sensor device 520 besides the cameras may likewise gather data from different sides of the sensor device 520.

The data gathered by the sensor device 520 is then conveyed to the transmitters 504, which may include 5G transmitters or other network radio devices for transmission to a central computing system, as described herein. The sensor data may be useful for monitoring environmental conditions within the storage unit 500 as well as providing useful data for operating other systems including air conditioning systems, refrigeration systems, dehumidifiers, and other such environmental control systems.

Figure 6:
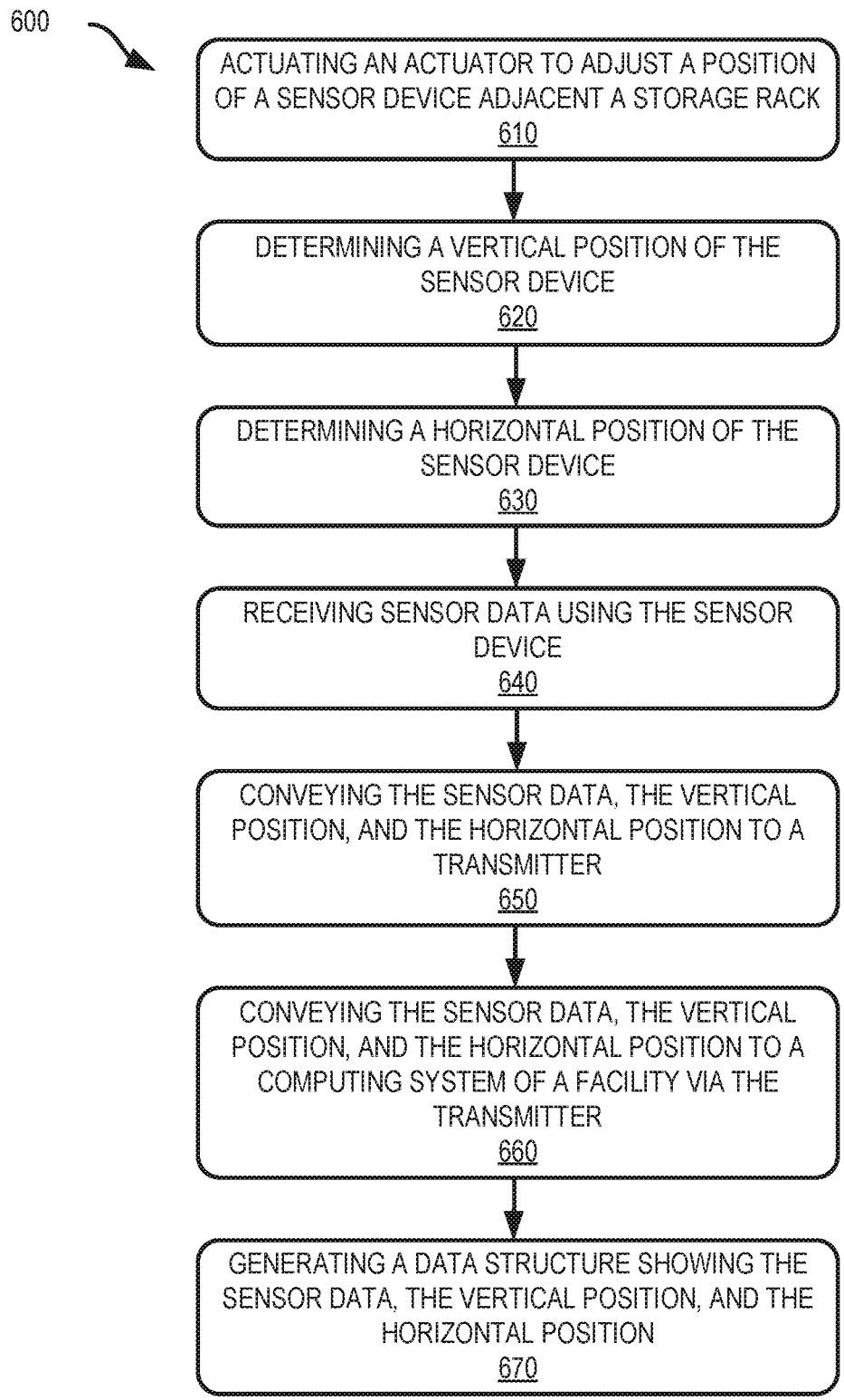
FIG. 6 depicts a flow diagram illustrating an example process for gathering real-time environmental parameters in three dimensions in accordance with at least some embodiments described herein.

FIG. 6 depicts a flow diagram illustrating an example process for gathering real-time environmental parameters in three dimensions in accordance with at least some embodiments described herein.

Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 610, the process 600 includes actuating an actuator to adjust a position of a sensor device adjacent a storage rack. The actuator may be a linear actuator, a track-based actuator, a hydraulic actuator, a pneumatic actuator, or any other actuating system. The actuator positions the sensor device at varying positions adjacent the storage rack. In some examples, the actuator may be a self-supporting unit, such as a pillar, to gather sensor data in a space between storage units or racks. The actuator may be actuated constantly, for example at a continuous non-stop rate, or may be actuated at varying rates, for example to gather data more frequently in the event of a device malfunction in a datacenter. The actuator may move the sensor device smoothly or in a stepped manner, stopping at regular intervals, such as at intervals of around ten centimeters.

At 620, the process 600 includes determining a vertical position of the sensor device. The vertical position of the sensor device may be determined based on a vertical position sensor, such as the z position sensor of FIG. 3. In some examples, the vertical position may be determined based on the position of the actuator that is then used by a processor to calculate, based on instructions in a memory, a vertical position based on the position of the actuator.

At 630, the process 600 includes determining a horizontal position of the sensor device. The horizontal position may be detected with a sensor in some examples. In some examples the horizontal position may be calculated, at least in part, based on a position of the actuator, for example in instances where the actuator travels at least partially in a horizontal direction. In some examples, the horizontal position may be determined based on the position of an associated 5G network transmitter associated with the storage rack, each storage rack within the facility having an associated 5G network transmitter.

At 640, the process 600 includes receiving sensor data using the sensor device. The sensor data may include identity data, occupation data relating to occupancy of the storage rack, image data, temperature data, humidity data, pressure data, and other such data as may be gathered by the sensor devices described herein.

At 650, the process 600 includes conveying the sensor data, the vertical position, and the horizontal position to a transmitter. The sensor data may be conveyed over a wired or wireless connection to a transmitter, such as a 5G network transmitter.

At 660, the process 600 includes conveying the sensor data, the vertical position, and the horizontal position to a computing system of a facility via the transmitter. In some examples this may include appending the sensor with horizontal position data associated with the horizontal positon of the transmitter.

At 670, the process 600 includes generating a data structure showing the sensor data, the vertical positon, and the horizontal position. The data structure may include a three dimensional heat map, three dimensional representation of the facility, data table of values, or any other suitable method of displaying sensor data and associated location data for each sensor data point.

In some examples, the process 600 may further include controlling one or more additional systems based on the data structure. This may, for example include activating a cooling system in a particular region of the facility to cool a hotspot produced by electronic devices. In some examples this may also include controlling the actuators and sensor devices to gather data at higher or lower frequencies. In some examples, abnormalities in the sensor data may result in instructing the actuators and sensor devices to gather data at a higher frequency to isolate the abnormality and help identify any problems within the system.

In some examples, the process 600 may include identifying an abnormality in the data structure. The abnormality may include an environmental parameter that exceeds a predetermined threshold value, such as a temperature spike. In response to the abnormality in the data, the system may send instructions to alter operations of the facility, for example by shifting workload to other devices, activating cooling or dehumidification systems, and generating fault notifications for a maintenance system to instruct inspection of potentially problematic devices.

Figure 7:
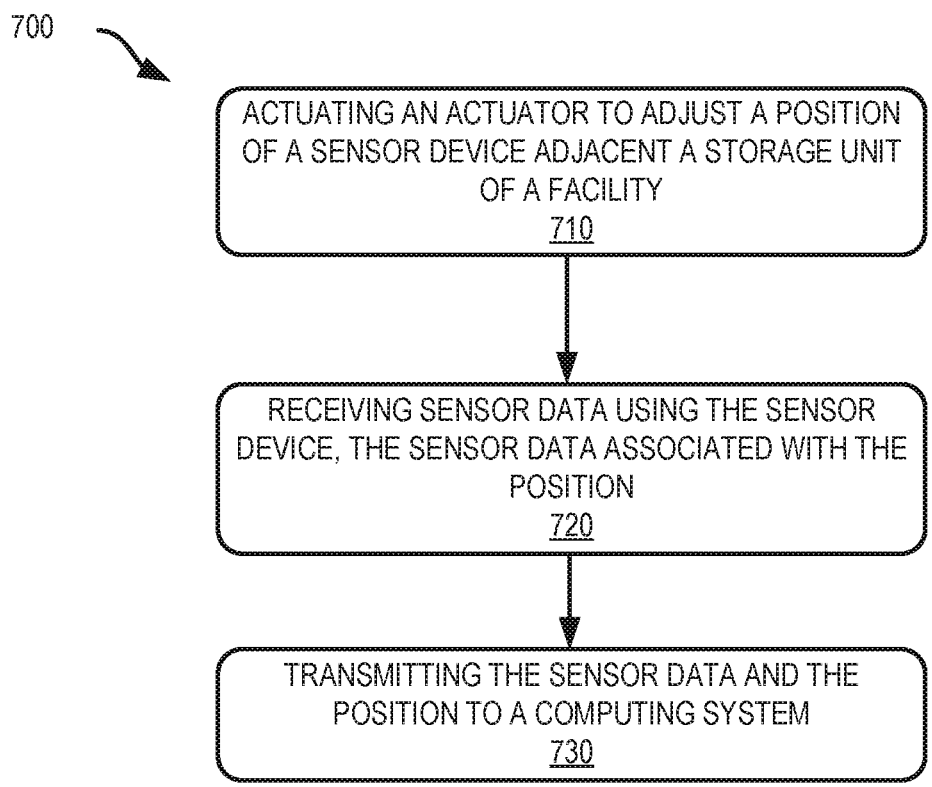
FIG. 7 depicts a flow diagram illustrating an example process for gathering real-time sensor data in three dimensions in accordance with at least some embodiments described herein.

FIG. 7 depicts a flow diagram illustrating an example process 700 for gathering real-time sensor data in three dimensions in accordance with at least some embodiments described herein.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 710, the process 700 includes actuating an actuator to adjust a position of a sensor device adjacent a storage unit of a facility. The actuator may be a linear actuator, a track-based actuator, a hydraulic actuator, a pneumatic actuator, or any other actuating system. The actuator positions the sensor device at varying positions adjacent the storage unit. In some examples, the actuator may be a self-supporting unit, such as a pillar, to gather sensor data in a space between storage units. The actuator may be actuated constantly, for example at a continuous non-stop rate, or may be actuated at varying rates or with varying time intervals between subsequent movements, for example to gather data more frequently or at a higher data gathering rate in the event of a device malfunction in a datacenter. In some examples, the data gathering rate may be a fixed rate at which the sensors gather data. The data gathering rate may also be a function of or associated with the speed of moving the sensor device. The data gathering rate may be a sampling rate of around a sample per second. In some examples the data gathering rate may be greater than a sample per second. In some examples, the data gathering rate may be less than a sample per second. The actuator may move the sensor device smoothly or in a stepped manner, stopping at regular intervals, such as at intervals of around ten centimeters.

At 720, the process includes receiving sensor data using the sensor device, the sensor device associated with the position. The sensor data may include identity data, occupation data relating to occupancy of the storage rack, image data, temperature data, humidity data, pressure data, and other such data as may be gathered by the sensor devices described herein.

At 730, the process includes transmitting the sensor data and the position to a computing system. The sensor data may be conveyed over a wired or wireless connection from the transmitter, such as a 5G network transmitter. The position may be transmitted over a wired or wireless connection by the transmitter with the sensor data. In some examples this may include appending the sensor data with the position data or otherwise associating the sensor data with the position.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes a user device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for monitoring environmental conditions in a datacenter, comprising:
    a vertical actuator coupled to a server rack along a vertical axis of the server rack;
    a sensing device coupled to the vertical actuator and positionable along the vertical axis by the vertical actuator, the sensing device comprising:
        a position sensor configured to detect a vertical position of the sensing device;
        an environment sensor configured to gather environmental data based on a variable data gathering rate;
        a transmitter in communication with the sensing device; and
    a network radio in communication with the sensing device, installed on the server rack at an (x,y,z) position within the datacenter, and configured to receive the vertical position and the environmental data from the transmitter of the sensing device and transmit the vertical position, the (x,y,z) position, and the environmental data to a server.

2. The system of claim 1, wherein the variable data gathering rate of the environment sensor increases in response to a determination that the environmental data indicates an environmental abnormality.

3. The system of claim 1, wherein the network radio is a 5G transmitter and the 5G transmitter is configured to transmit the vertical position and the environmental data at a first time interval and the (x,y,z) position at a second time interval, the first time interval greater than the second time interval.

4. The system of claim 1, wherein the sensing device further comprises a Radio Frequency Identification (RFID) reader that receives RFID data from a component installed on the server rack and the network radio transmits the vertical position and the RFID data is received along with corresponding environmental data, and wherein the server, in response to receiving the environmental data, the vertical position, the (x,y,z) position, and the RFID data determines an (x,y,z) position of the component, an identity of the component, and an operational condition of the component.

5. A system, comprising:
    an actuator coupled to a storage unit of a facility;
    a sensing device coupled to the actuator and positionable along an axis of the storage unit by the actuator, the sensing device comprising:
        a position sensor configured to detect a position of the sensing device;
        a sensor configured to gather sensor data based on a variable data gathering rate; and
        a transmitter in communication with the sensing device, the transmitter configured to transmit the position and the sensor data to a network radio; and
    the network radio in communication with the transmitter, installed on the storage unit, and configured to receive the position from the transmitter and transmit the position and the sensor data to a computing resource.

6. The system of claim 5, further comprising a second actuator coupled to the storage unit and the actuator along a second axis, the second axis being in a different direction than the axis of the storage unit, the second actuator positionable along the second axis to position the actuator along the second axis.

7. The system of claim 6, wherein the computing resource comprises:
    a processor; and
    a memory having instructions stored thereon that when executed, cause the processor to generate a data structure showing the sensor data in relation to the position.

8. The system of claim 7, wherein the memory stores further instructions that, when executed, cause the processor to additionally determine a condition at a particular position within the storage unit based on the sensor data and the position.

9. The system of claim 7, wherein the sensor comprises an environmental sensor and the memory stores further instructions that, when executed cause the processor to additionally instruct an environment conditioning system to adjust an environmental parameter within the facility based on the sensor data.

10. The system of claim 7, wherein the sensor comprises an identification sensor to gather identification data and environmental sensor to gather environmental data, and wherein the memory stores further instructions that, when executed cause the processor to additionally receive the identification data and the environmental data and identify an abnormality in the environmental data and a component stored in the storage unit associated with the abnormality.

11. The system of claim 10, wherein the memory stores further instructions that, when executed cause the processor to additionally generate a fault notification in response to identifying the component associated with the abnormality in the environmental data.

12. The system of claim 5, wherein the computing resource of the facility is in communication with a plurality of network radios each installed at a different storage unit.

13. The system of claim 5, wherein the sensor comprises at least one of:
- a temperature sensor;
- a humidity sensor;
- a pressure sensor;
- a light sensor;
- a LIDAR sensor;
- a camera;
- an RFID sensor;
- an occupancy sensor; or
- an identification sensor.

14. A method, comprising:
- actuating a first actuator and a second actuator to adjust a position of a sensor device positioned adjacent a storage unit of a facility, the sensor device positionable (i) along a first axis of the storage unit by the first actuator and (ii) along a second axis by the second actuator, the second axis different from the first axis;
- controlling a variable data gathering rate of the sensor device;
- receiving sensor data using the sensor device based on the variable data gathering rate, the sensor data associated with the position; and
- transmitting the sensor data and the position to a computing system.

15. The method of claim 14, further comprising:
- generating a data structure associating the sensor data and the position;
- detecting an abnormality based on the data structure;
- identifying the sensor device associated with a corresponding position of the abnormality; and
- controlling the variable data gathering rate of the sensor device based on the detection of the abnormality.

16. The method of claim 15, further comprising controlling, based on the variable data gathering rate, a speed of adjusting the position of the sensor device by actuating the first actuator and the second actuator.

17. The method of claim 14, further comprising:
- receiving, by a network radio, the sensor data and the position of the sensor device; and
- transmitting, by the network radio to the computing system, the sensor data and the position of the sensor device.

18. The method of claim 14, wherein the sensor data comprises identification data and environmental data, and the method further comprising:
- identifying an abnormality based on the environmental data;
- identifying a component stored in the storage unit associated with the abnormality based on the identification data, the environmental data, and the position; and
- generating a fault signal identifying the component.

19. The method of claim 14, further comprising:
- actuating an additional actuator to adjust a second position of a second sensor device positioned adjacent a second storage unit of the facility;
- receiving second sensor data using the second sensor device, the second sensor data associated with the second position; and
- transmitting the second sensor data and the second position to the computing system.

20. The method of claim 14, further comprising:
- generating a data structure associating the sensor data and the position; and
- activating a system of the facility based on the data structure to adjust an environmental parameter detected by the sensor device.

* * * * *